United States Patent [19]

Sperry et al.

[11] Patent Number: 4,647,610

[45] Date of Patent: Mar. 3, 1987

[54] AQUEOUS POLYMER COMPOSITIONS CONTAINING SURFACE-ACTIVE EVAPORATION SUPPRESSANTS

[75] Inventors: Peter R. Sperry, Doylestown; Chao-Jen Chung, Hatfield, both of Pa.

[73] Assignee: Rohm and Haas Company, Philadelphia, Pa.

[21] Appl. No.: 846,671

[22] Filed: Mar. 31, 1986

Related U.S. Application Data

[63] Continuation-in-part of Ser. No. 750,716, Jun. 28, 1985, abandoned.

[51] Int. Cl.$^4$ ................................................. C08K 5/05
[52] U.S. Cl. .................................... 524/377; 524/322; 524/376; 524/385; 524/394

[58] Field of Search ............... 524/322, 376, 377, 385, 524/394

[56] References Cited

U.S. PATENT DOCUMENTS 3,553,123  1/1971  Behnke ................................ 524/322
4,393,151  7/1983  Dawans .............................. 524/394

*Primary Examiner*—Paul R. Michl
*Attorney, Agent, or Firm*—Carl W. Battle

[57] ABSTRACT

Low levels of surface-active, aliphatic $C_{16}$ or greater hydrocarbon-type compounds are used to reduce the rate of evaporation of water from waterborne polymer products such as latex coatings. This increases the wet-edge or open time of the freshly applied coating, improves integrity and adhesion of the dried coating, and reduces skin formation in containers and on application equipment.

18 Claims, No Drawings

AQUEOUS POLYMER COMPOSITIONS CONTAINING SURFACE-ACTIVE EVAPORATION SUPPRESSANTS

CROSS REFERENCE TO RELATED APPLICATIONS

This is a continuation-in-part of application Ser. No. 750,716, filed June 28, 1985, now abandoned.

BACKGROUND OF THE INVENTION

Water-containing polymeric products such as waterborne paints, stains, adhesives, printing inks and coatings find increasing utility because of their safety, economy and ease of application. However, the drying characteristics of such products are variable and cannot be easily controlled, because they are basically limited to the evaporation characteristics of water. Thus, the drying behavior of aqueous polymer products is highly dependent on the conditions of temperature, humidity and air velocity. For example, coating films of such products can dry practically instantaneously under hot, dry, windy conditions leading to poor lapping characteristics. Further, such drying conditions tend to impair the quality of film formation, penetration of and adhesion to the substrate.

Polymeric compositions borne in organic solvents are different from the waterborne products, in that solvents or solvent blends with a wide range of boiling points and volatility can be used to control the drying characteristics according to application requirements. For example, consumer paints employing alkyd resins are made with hydrocarbon solvents of volatility selected such that the drying rate is sufficient to allow setting of the film to minimize sagging, running, and dust pickup, yet which permits good "melting in" of paint at overlapping brush or roller strokes. The disadvantages of such organic solvent based compositions are the difficulties of clean-up, the toxic nature of organic solvents, environmental pollution, and the relatively high cost of organic solvents which are ultimately wasted.

The conventional practice in solving the drying rate problems of water-based compositions is to add substantial levels of water soluble solvents to such systems to increase the wet-edge or open time. These techniques are discussed by M. D. Andrews, "Influence of Ethylene and Propylene Glycols on Drying Characteristics of Latex Paints," *Journal of Paint Technology*, vol. 46, page 40 (1974); D. A. Sullivan, "Water and Solvent Evaporation from Latex and Latex Paint Films," *Journal of Paint Technology*, vol. 47, page 60 (1975); and C. R. Martens, *Waterborne Coatings*, Van Nostrand Reinhold, page 153 (1981). These references disclose the use of short chain water-soluble alcohols and glycols as cosolvents for water-based coatings to improve freeze-thaw stability, aid coalescence of the latex particles, improve leveling, etc., in addition to prolonging wet-edge or open time. To obtain significant improvement in wet-edge or open time, high levels of these low molecular weight cosolvents are required, often 10 to 20 percent or more based on total volatile content, since they are believed to function simply by being completely soluble in water; thus reducing the vapor pressure of water. These cosolvents exhibit low surface activity, and the use of high levels tend to negate the intrinsic advantages of the water-based compositions.

The use of evaporation retarders on the surface of reservoirs to control water evaporation is known in the art. The evaporation retarders are typically aliphatic alcohols and ether alcohols containing 16 to 30 carbons, such as described in U.S. Pat. No. 3,146,059 and Indian Pat. No. 70,670. The use of these long chain alcohols as surface monolayers on water is further discussed by E. R. Noe and R. G. Dressler, "Performance of Odd and Even-Chain Pure Alcohol Monolayers in Water Evaporation Retardation," *I & EC Product Research and Development*, vol. 6, page 132 (1967) and in other literature. Although these long chain alcohols and ether alcohols have been effective on relatively pure water due to their surface activity, their utility in multi-component, water-based polymeric compositions had not previously been recognized or discovered.

U.S. Pat. No. 2,965,678 discloses the use of branched-chain alcohols as wetting agents and detergents. However there is no teaching or suggestion that unbranched-chain compounds are effective for water evaporation retardation in aqueous polymer compositions.

U.S. Pat. No. 3,287,300 teaches the use of aliphatic carboxylic acids in polyvinyl ester emulsions to lower the coalescense temperature. The '300 patent teaches nothing about evaporation suppression and the importance of using $C_{16}$–$C_{24}$ aliphatic straight-chain compounds to reduce water evaporation from polymer compositions.

U.S. Pat. No. 3,553,123 discloses cleaning and polishing compounds which are emulsions of natural and synthetic waxes and resins, and which contain very large quantities (i.e. 40–50%) of volatile organic solvent. Moreover, the emulsifiers disclosed in the '123 patent would not be effective as evaporation suppressants because they are referred to as being highly branched, having a relatively low number of carbon atoms (i.e. 12–18), or having a high number of oxyethylene units.

U.S. Pat. No. 3,847,855 discloses a latex polymerization process which uses a volatile surfactant for the polymerization. The '855 patent teaches nothing about evaporation suppression, and there is no teaching or suggestion that any of the diverse surfactants mentioned would be effective in retarding evaporation of water. Rather, the fugitive surfactants described in the '855 patent are used as an ingredient during the polymerization process.

U.S. Pat. No. 3,988,275 discloses a polymerization process for making concentrated latex of synthetic rubbers using emulsifying agents such as fatty acids. Methods to achieve suppression of evaporation rate of water from the latex formulations are not taught or implied. The emulsifiers disclosed in the '275 patent are generally not suitable for evaporation suppression because they are generally too asymetrical and of relatively short chain length.

U.S. Pat. No. 4,131,585 discloses plasticizer-type leveling agents for floor polish emulsions. The leveling agents are required to contain either nonlinear alkyl or alkylbenzene hydrocarbon groups, and would therefore not be suitable evaporation suppressants because they do not form compact surface films to retard water evaporation. Moreover, they are required to contain 15 or less carbon atoms in the alkyl chain. The '585 patent specifically teaches against the use of linear alcohol derivatives.

U.S. Pat. No. 4,330,338 discloses emulsions in water of resins dissolved in organic solvent for use as pharmaceutical coating compositions. The '338 patent teaches or suggests nothing regarding the selection of surfactants except that they are to assist in producing a stable emulsion. Nothing is taught or suggested concerning their surface activity or effect on water evaporation. The fatty alcohol ethoxylates disclosed as emulsifiers have only lauryl (12 carbon atoms) hydrophobes, and generally have too excessive a degree of ethoxylation for use as effective evaporation suppressants.

U.S. Pat. No. 4,454,260 discloses suspensions of water-soluble polymers in organic solvent and the use of surfactants therefor. Such materials are then later dissolved in water to make a polymer solution for oil recovery from wells. The '260 patent is totally unrelated to the use of long straight-chain aliphatic compounds for reduction in evaporation rate of water from waterborne polymer compositions. Rather the '260 patent teaches the use of alkali or alkaline-earth metal salts of fatty acids as thickener for the suspensions of water-soluble polymers in organic solvent.

Applicants have surprisingly discovered that low levels of surface active, long chain, aliphatic hydrocarbon-type compounds can be used to control and improve the drying characteristics of aqueous-based polymer compositions. These long chain aliphatic compounds are effective as evaporation suppressing agents at levels as low as 1% by weight or less. Their effectiveness is believed to be attributed to their ability to become highly concentrated and compactly ordered at the air/water interface, even when initially uniformly mixed into the aqueous-based polymer compositions.

It is the object of this invention to provide a method for reducing the evaporation rate of water from aqueous polymer compositions using low levels of surface active, long chain, unbranched aliphatic compounds. It is also an object of this invention to extend the wet-edge or open time of aqueous-based coatings and the like when applied to a substrate. It is a further object of the invention to reduce skinning of waterborne polymer compositions in containers, and to retard drying out on application equipment such as rollers and brushes. It is an even further object of the present invention to improve the quality of film formation/adhesion of aqueous polymeric coatings by incorporating therein low levels of surface active evaporation suppressants.

SUMMARY OF THE INVENTION

This invention relates to a method for reducing the rate of evaporation of water from waterborne polymer products, by incorporating therein low levels of surface-active aliphatic $C_{16}$ or greater hydrocarbon-type compounds. The invention also relates to aqueous polymer compositions containing these $C_{16}$ or greater surface-active evaporation suppressants. Useful surface-active, aliphatic evaporation-suppressing agents for the invention include hydrocarbon-type compounds consisting of a saturated, unbranched carbon-carbon chain length of about 16 atoms or greater and containing one or more hydrophilic groups. The evaporation suppressing agents can be uniformly incorporated into aqueous polymer compositions preferably at levels of about 1% or less by weight. The evaporation suppressants preferably include the long, straight-chain alcohols, ether alcohols, and salts of carboxylic acids.

The evaporation suppressants are effective in extending the wet-edge or open time of waterborne polymer coatings to allow good melding or melting-in of the coating at overlapping brush or roller strokes. The evaporation suppressants are also effective in retarding skinning of waterborne polymers in containers, reducing drying out on application equipment, and improving quality of film formation/adhesion.

DETAILED DESCRIPTION

This invention involves a novel method for reducing the evaporation rate of water from waterborne polymer products, and involves novel aqueous polymer compositions containing low levels of surface-active, aliphatic $C_{16}$ or greater evaporation-suppressing agents. The use of low concentrations of these long-chain aliphatic evaporation suppressants in waterborne polymeric products, such as latex coating, increases the wet-edge or open time of the coating, improves film formation/adhesion, and reduces skinning.

The evaporation suppressing agents useful in practicing this invention include surface-active aliphatic compounds having a saturated, unbranched carbon-carbon chain length of about 16 atoms or greater, and containing one or more hydrophilic groups. Particularly useful evaporation suppressants include, for example, straight chain alcohols, ether alcohols, carboxylic acids and salts thereof. The evaporation suppressants have the structural formulae:

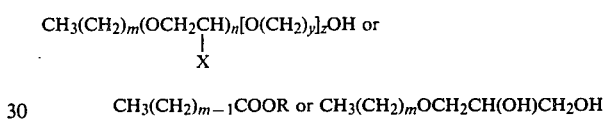

$CH_3(CH_2)_{m-1}COOR$ or $CH_3(CH_2)_mOCH_2CH(OH)CH_2OH$ wherein m is an integer from about 15 to about 25; n is an integer from 0 to about 3; y is an integer from 1 to about 4; z is an integer from 0 to about 3; X is —H or —CH$_3$; R is —H, —NH$_4$, amine or alkali metal salt; and the sum of n and z does not exceed 3. Preferably m is 18 to 24, n is 0 to 2, y is 2 to 4, z is 0 to 2, R is amine or alkali metal salt, and the sum of n and z does not exceed 2. More preferably (i) m is 20 to 24, n is 0, y is 2 or 3, and z is 0 or 1, or (ii) n is 1 or 2 and z is 0. Most preferably n is 0, y is 2, and z is 0 or 1. The evaporation suppressants preferably contain hydrophilic groups selected from —OH, salts of —COOH,

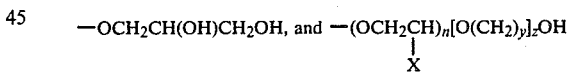

wherein X, n, y and z are as defined above. Other diverse hydrophilic groups are believed to be suitable for this invention, such as, for example, sulfates, sulfonates, amines, amine oxides, amides, phosphates, and phosphonates.

Some examples of suitable evaporation suppressants for practicing this invention are hexadecanol, heptadecanol, octadecanol, nonadecanol, eicosanol and related ether alcohols and carboxylic acids. The most preferred evaporation suppressant for use in this invention is 1-eicosanol[$CH_3(CH_2)_{18}CH_2OH$].

The evaporation suppressants are preferably uniformly incorporated into the waterborne polymer compositions. They can be added to the composition by a variety of methods, such as, as a dilute solution in organic solvent, as a fine powder, as a molten liquid, and as an emulsion in water. The evaporation suppressants may be mixed or blended into the polymer compositions using any techniques known in the art. To be useful for this invention, the evaporation suppressants themselves must be solid at standard conditions, although they may be added as a solution or molten liquid as mentioned above.

The invention is practiced using relatively low levels of the evaporation suppressants in the polymeric compositions. This allows control of drying characteristics, as with solvent-based systems, but retains all the advantages of aqueous-based compositions. The specific concentration of evaporation suppressants will depend on the specific compound used, the specific polymeric formulation, and application needs. Effective concentrations of evaporation suppressant are generally less than 5% by weight based on the total weight of the polymer compositions, and preferably the concentration is about 1% by weight or less. Either one or a mixture of evaporation suppressants may be used in carrying out the invention.

A preferred embodiment is to add the evaporation suppressants to the aqueous polymeric compositions as a pre-emulsion in water. More preferably the pre-emulsion of suppressants in water contains an auxilliary surfactant to aid in stabilizing the emulsion. It is important to select an emulsifier which does not interfere with the surface barrier properties or surface activity of the suppressants; with salts of aliphatic long chain carboxylic acids being preferred. The evaporation suppressants may also be added as a solution in a suitable organic solvent.

The effectiveness of the evaporation suppressants in aqueous polymer compositions is believed to be attributed to their ability to form highly compact and dense monolayers at the air/water interface. It is speculated that the hydrocarbon portion of the molecule is oriented toward the air, while the hydrophilic groups are in the surface region of the water. Surprisingly, the evaporation suppressants can exhibit good surface activity even in the presence of the multiple components and other competing surface active ingredients in the polymer compositions, and even when uniformly mixed therein. The evaporation suppressants that are useful in forming the aforementioned compact and dense monolayers appear to be those that are solids by themselves at standard conditions.

The evaporation suppressants are useful in controlling the drying characteristics of a variety of aqueous polymer compositions, such as paints, stains, varnishes, coatings, adhesives, and inks. These aqueous polymer compositions include, for example, polymeric latexes, solution polymers, and colloidal dispersions, such as described by C. R. Martens, *Waterborne Coatings*, Van Nostrand Reinhold, pages 41-51 (1981). The suppressants are particularly suitable for use in acrylic latex type compositions such as described in U.S. Pat. Nos. 4,129,448; 4,102,843; and 3,736,286, the disclosures of which are herein incorporated by reference. In a preferred embodiment of the invention, the polymeric composition is an aqueous dispersion of a vinyl or acrylic emulsion, such as those used in making water-based paints, stains, adhesives and varnishes.

Suitable aqueous polymer compositions for paints are aqueous addition polymer dispersions, generally obtained most conveniently by direct emulsion polymerization. Also suitable aqueous polymer compositions include aqueous solution polymers, emulsions of resin in water, and colloidal dispersions. The most important of these dispersions used in making water-based paints are polymers including homopolymers and copolymers of:
(1) vinyl esters of an aliphatic acid having 1 to 18 carbon atoms, especially vinyl acetate; (2) acrylic acid esters and methacrylic acid esters of an alcohol having 1 to 18 carbon atoms, especially methyl acrylate, ethyl acrylate, butyl acrylate, 2-ethylhexyl acrylate, methyl methacrylate, ethyl methacrylate and butyl methacrylate; and (3) mono- and di-ethylenically unsaturated hydrocarbons, such as ethylene, isobutylene, styrene, and aliphatic dienes, such as butadiene, isoprene, and chloroprene.

Poly(vinyl acetate) and copolymers of vinyl acetate with one or more of the following monomers; vinyl chloride, vinylidene chloride, styrene, vinyltoluene, acrylonitrile, methacrylonitrile, one or two of the acrylic and methacrylic acid esters mentioned above are well known as the film-forming component of aqueous-based paints. Similarly copolymers of one or more of the acrylic or methacrylic acid esters mentioned above with one or more of the following monomers: vinyl acetate, vinyl chloride, vinylidene chloride, styrene, vinyltoluene, acrylonitrile, and methacrylonitrile are also more or less conventionally employed in aqueous base paints. Homopolymers of ethylene, isobutylene, and styrene, and copolymers of one or more of these hydrocarbons with one or more esters, nitriles or amides of acrylic acid or of methacrylic acid or with vinyl esters, such as vinyl acetate and vinyl chloride, or with vinylidene chloride are also used. The diene polymers are generally used in aqueous base paints in the form of copolymers with one or more monomers following: styrene, vinyltoluene, acrylonitrile, methacrylonitrile, and the abovementioned esters of acrylic acid or methacrylic acid. It is also quite common to include a small amount, such as $\frac{1}{2}$ to 2.5% or more, of an acid monomer in the monomer mixture used for making the copolymers for all three general types mentioned above by emulsion polymerization. Acids used include acrylic, methacrylic, itaconic, aconitic, citraconic, crotonic, maleic, fumaric, the dimer of acrylic acid, and so on.

These aqueous dispersions as the emulsion polymer in the paint may be made using one or more emulsifiers of anionic, cationic, or non-ionic type. Mixtures of two or more emulsifiers regardless of type may be used, except that it is generally undesirable to mix a cationic with an anionic type in any appreciable amounts since they tend to neutralize each other. The average particle size or diameter of these dispersed polymers may be from about 0.03 to 3 microns or even larger. The particle size, whenever referred to herein, is the "weight average diameter." This number, expressed in microns, can be determined by electron microscopy. In general, the molecular weights of these emulsion polymers are high, e.g., from about 100,000 to 10 million viscosity average, most commonly above 500,000.

In general, a gallon of emulsion paint is comprised of about 0.5 to 3 lbs. of film-forming resin and about 0.2 to about 5 lbs. of finely-divided pigment. Typical pigments are titanium dioxide and other titanium pigments, white lead, zinc oxide, zinc sulfide, barium sulfate, calcium carbonate, lithopone, silica, talc, mica, clays, iron oxide, carbon black, cadmium sulfide, toluidene red, chrome orange, chrome yellow, chrome green, and others known in the art. Typical latices of film-forming resins are those of the alkyl acrylates and methacrylates, vinyl acetate, styrene-butadiene, and others known in the art. Minor amounts of other coatings additives may be included in the paint formulations, for example, antifoams, mildewcides, thickeners, wetting agents, bacteriostats, etc. The present invention is also useful in clear unpigmented latex coatings, stains and varnishes.

The following examples are presented to further illustrate this invention, but are not intended in a limitative sense.

EXAMPLES I-VIII

Various long chain aliphatic hydrocarbon-type compounds were evaluated as evaporation suppressants in both a latex and a formulated latex coating. The latex was an aqueous emulsion of synthetic acrylic polymer having a 45% by weight solids content which is sold by Rohm and Haas Company as Emulsion E-1630. The formulated latex coating was prepared using the same acrylic emulsion according to the following recipe:

| Ingredient | Amount (parts by weight) |
| --- | --- |
| Acrylic latex (E-1630) | 600 |
| Wetting agent | 2.0 |
| Antifoamer | 2.5 |
| Coalescent | 40.0 |
| Thickener | 24.8 |
| Neutralizing Base | 6.4 |
| Water | 170.8 |

25 gram samples of each of the unformulated and formulated latex coating were placed in 9 cm diameter dishes, and to each was added dropwise 1 gram of a 0.2% by weight solution of various hydrocarbon compounds in hexane to be tested as evaporation retarders. After flashing off the hexane, weight loss from each sample due to water evaporation was measured and compared with control samples containing no evaporation suppressants. The results are expressed as the percent reduction in evaporation and are presented in Table I.

TABLE I

| | Evaporation Suppressant | % Reduction in Evaporation Rate (25° C.) | |
| --- | --- | --- | --- |
| | | Latex | Formulated Latex Coating |
| Control | None | 0 | 0 |
| Example I | $CH_3(CH_2)_{15}OH$ | 28 | 13 |
| Example II | $CH_3(CH_2)_{17}OH$ | 23 | 13 |
| Example III | $CH_3(CH_2)_{19}OH$ | 72 | 60 |
| Example IV | $CH_3(CH_2)_{21}OH$ | 75 | 17 |
| Example V | $CH_3(CH_2)_{17}(OCH_2CH_2)_2OH$ | 19 | 10 |
| Example VI | $CH_3(CH_2)_{21}OCH_2CH_2OH$ | 58 | 30 |
| Example VII | Oleic Acid | 0 | — |
| Example VIII | Stearic Acid | 17% | — |

EXAMPLES IX-XI

Additional compounds were evaluated for their effectiveness as evaporation suppressants following the procedures of Examples I-VIII above, except that 0.1% by weight solutions of the hydrocarbons in hexane were used. The results of this evaluation are given in Table II.

TABLE II

| | Evaporation Suppressant | % Reduction in Evaporation Rate (25° C.) | |
| --- | --- | --- | --- |
| | | Latex | Formulated Latex |
| Control | None | 0 | 0 |
| Example IX | $CH_3(CH_2)_{21}OCH_2CH_2CH_2OH$ | 54 | 31 |
| Example X | $CH_3(CH_2)_{17}OCH_2CH(OH)CH_2OH$ | 25 | 25 |
| Example XI | $CH_3(CH_2)_{21}OCH_2CH(OH)CH_2OH$ | 38 | 25 |

EXAMPLE XII 1-eicosanol, $CH_3(CH_2)_{19}OH$, was evaluated as an evaporation suppressant when uniformly incorporated into a clear latex coating. To 31.5 g of acrylic latex (sold by Rohm and Haas Company as Rhoplex AC-61) having a solids content of 46.5% by weight was added with stirring 9.0 g water and 3.5 g of a 2% by weight aqueous solution of hydroxyethyl cellulose thickening agent. To this mixture was then added with stirring 100 mg of 1-eicosanol that had been dissolved in 2 grams of methyl ethyl ketone. A control formulation was prepared similarly but using 2 grams of methyl ethyl ketone without 1-eicosanol.

The rates of water evaporation of the test and control formulations at 25° C. and 55% relative humidity were measured gravimetrically. The open time of the samples was measured by brushing fresh coating at various elapsed times perpendicular to and including the edge of a cast film of the coating. Open time is defined as the time at which a distinct boundary line is left at the edge of the casting, indicating that drying at its edge has occurred to such extent that the brushed film does not easily mix in. The results of this evaluation are presented on Table III.

TABLE III

| | Control Coating | Coating with 1-eicosanol |
| --- | --- | --- |
| Rate of water evaporation (mg/min.-cm$^2$) | 0.072 | 0.037 |
| Open time (minutes) | 1.0 | 2.5 |

EXAMPLE XIII 1-eicosanol was evaluated as an evaporation suppressant in a white acrylic latex paint. An emulsion of 1-eicosanol was prepared by first dissolving at 80° C. a mixture of 6.0 grams 1-eicosanol, 1.4 g stearic acid, 1.4 g of 30% ammonia, and 10 g of aliphatic hydrocarbon solvent (sold by Exxon Co. as Norpar 13), followed by stirring in 60 g of water preheated to 80° C., and quickly cooling the mixture in an ice bath. White paints were then formulated according to the following recipe:

| | Amount (parts by weight) | |
| --- | --- | --- |
| Ingredient | Control Paint | Paint containing 1-eicosanol |
| Mix in Cowles Dissolver: | | |
| Water | 35.7 | 35.7 |
| Dispersant | 6.2 | 6.2 |
| Wetting Agent | 1.4 | 1.4 |
| Antifoamer | 2.0 | 2.0 |
| Rutile TiO$_2$ | 154.0 | 154.0 |

-continued

| Ingredient | Amount (parts by weight) | |
|---|---|---|
| | Control Paint | Paint containing 1-eicosanol |
| Let Down with: | | |
| Acrylic Latex (40.9% solids) | 478.1 | 478.1 |
| Water | 302.0 | 223.0 |
| Thickener | 17.5 | 15.5 |
| Ammonium hydroxide (30%) | 7.2 | 6.8 |
| 1-eicosanol emulsion | 0.0 | 78.8 |
| (volume % solids) | 25 | 25 |

Water evaporation rates and open time of the paint samples were measured as in Example XII, and the results are presented in Table IV.

TABLE IV

| | Control Coating | Coating with 1-eicosanol |
|---|---|---|
| Rate of water evaporation (mg/min.-cm$^2$) | 0.067 | 0.038 |
| Open-time (minutes) | 2 | 10 |

EXAMPLE XIV 1-eicosanol was evaluated for its effectiveness in reducing skinning of a stored latex. 130 g aliquots of 46.5% by weights solids content acrylic latex (Rhoplex AC-61) were charged to ½ pint (7 cm diameter) paint cans. 1-eicosanol was added to the above samples using various techniques of addition. The samples were monitored gravimetrically for water loss and examined for degree of skinning over the surface for a 24-hour and a 48-hour period. The results of this evaluation are presented in Table V.

TABLE V

| 1-eicosanol addition | Weight Loss | | Skinning | |
|---|---|---|---|---|
| | 24-hr. | 48-hr. | 24-hr. | 48-hr. |
| 1. None | 4.3 g | 8.4 g | severe | severe |
| 2. None (spread 2 g hexane on surface) | 4.0 g | 8.3 g | severe | severe |
| 3. Spread 2 g of 0.2% eicosonal in hexane on surface | 0.5 g | 1.0 g | none | very slight |
| 4. Spread 0.1 g of 0.2% eicosanol in hexane on surface | 1.35 g | 3.4 g | slight | slight |
| 5. Stirred in 2 g of eicosanol emulsion prepared in Example XIII | 1.55 g | 3.1 g | slight | slight |

EXAMPLE XV 1-eicosanol was evaluated for improvement of film formation/adhesion in a white acrylic latex paint. Exterior white latex paints were formulated according to the following recipe:

| Ingredient | Amount (parts by weight) | |
|---|---|---|
| | Control Paint | Paint with Eicosanol |
| Mix In Cowles Dissolver: | | |
| Thickener (100%) | 3.0 | 3.0 |
| Water | 120.0 | 120.0 |
| Dispersant | 1.5 | 1.5 |
| Wetting Agent | 2.5 | 2.5 |
| Antifoamer | 225.0 | 225.0 |
| Rutile TiO$_2$ | 25.0 | 25.0 |
| Zinc Oxide | 25.0 | 25.0 |
| Aluminum Silicate | 147.3 | 147.3 |
| Clay | 50.0 | 50.0 |
| Silica Silicate | 5.0 | 5.0 |
| Let Down With: | | |
| Acrylic Latex (Rhoplex AC-61) | 398.0 | 398.0 |
| Antifoamer | 3.0 | 3.0 |
| Coalescent | 3.0 | 3.0 |
| Water | 121.2 | 105.2 |
| Thickener (2.5% aqueous solution) | 64.0 | 0.0 |
| 1-Eicosanol emulsion (prepared in Example XIII) | 0.0 | 80.0 |
| Properties | | |
| Volume % solids | 36 | 36 |
| Stormer Viscosity (KU) | 77 | 69 |

The paint samples were brushed at natural spread rate over predried (250° F. for 30 minutes in an oven) white pine inside a laboratory hood, and allowed to dry inside the hood. The paint films were monitored for the rate of drying and examined for film cracking after complete drying. The results of this evaluation are presented in Table VI. It can be seen that the paint containing 1-eicosanol has a longer drying time which gives the acrylic latex particles a longer time to coalesce and adhere to substrate, thus reducing film cracking.

TABLE VI

| | Control Paint | Paint with Eicosanol |
|---|---|---|
| Drying time (minutes) | 5 | 9 |
| Film Cracking | Moderate | None |

The above examples demonstrate the effectiveness of unbranched, aliphatic long chain, surface-active compounds as evaporation suppressants in aqueous polymer compositions to increase open time, reduce skinning, and improve film formation/adhesion.

We claim:

1. A process for reducing the evaporation rate of water from aqueous-based polymer compositions to retard skin formation and to extend wet-edge time comprising uniformly adding to said aqueous-based polymer compositions a low level of one or more surface active, aliphatic evaporation-suppressing agents consisting of a saturated, unbranched carbon-carbon chain length of about 16 to about 24 carbon atoms and containing one or more hydrophilic groups selected from —OH, —OCH$_2$CH(OH)CH$_2$OH, and

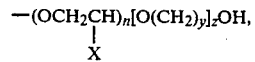

wherein X is —H or —CH$_3$; n is an integer from 0 to 2; y is an integer from 1 to about 4; z is an integer from 0 to 2; and the sum of n and z does not exceed 2.

2. A process of claim 1 wherein (i) n is 0, y is 2 or 3, and z is 0 or 1, or (ii) n is 1 or 2 and z is 0.

3. A process of claim 1 wherein n is 0, y is 2, and z is 0 or 1.

4. A process of claim 1 wherein the level of said evaporation-suppressing agents is about 5% by weight or less based on the total weight of the aqueous polymer composition.

5. A process of claim 1 wherein the level of said evaporation-suppressing agents is about 1% by weight or less based on the total weight of the aqueous polymer composition.

6. A process of claim 1 wherein the aqueous polymer composition is selected from the group consisting of acrylic, styrene acrylic, styrene butadiene, and vinyl acetate polymeric latexes.

7. A process of claim 1 wherein the evaporation suppressing agents are added to the aqueous polymer composition as a pre-emulsion in water or as a solution in an organic solvent.

8. A process of claim 7 wherein the pre-emulsion contains an emulsifier.

9. A process of claim 8 wherein the emulsifier is a salt of aliphatic long chain carboxylic acids.

10. A process of claim 1 wherein the evaporation-suppressing agents are selected from the group consisting of $CH_3(CH_2)_{15}OH$, $CH_3(CH_2)_{17}OH$, $CH_3(CH_2)_{19}OH$, $CH_3(CH_2)_{21}OH$, $CH_3(CH_2)_{17}(OCH_2CH_2)_2OH$, $CH_3(CH_2)_{17}OCH_2CH(OH)CH_2OH$, $CH_3(CH_2)_{21}OCH_2CH_2OH$, $CH_3(CH_2)_{21}OCH_2CH_2CH_2OH$ and $CH_3(CH_2)_{21}OCH_2CH(OH)CH_2OH$.

11. A process of claim 10 wherein the evaporation-suppressing agent is $CH_3(CH_2)_{19}OH$.

12. A composition of matter comprising a uniform mixture of an aqueous-based polymer product and a low level of one or more surface active, aliphatic evaporation-suppressing agents consisting of a saturated, unbranched carbon-carbon chain length of about 16 to about 24 carbon atoms and one or more hydrophilic groups selected from —OH, —OCH$_2$CH(OH)CH$_2$OH, and

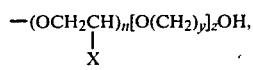

wherein X is —H or —CH$_3$; n is an integer from 0 to 2; y is an integer from 1 to about 4; z is an integer from 0 to 2; and the sum of n and z does not exceed 2.

13. A composition of claim 12 wherein (i) n is 0, y is 2 or 3, and z is 0 or 1, or (ii) n is 1 or 2 and z is 0.

14. A composition of claim 12 wherein n is 0, y is 2, and z is 0 or 1.

15. A composition of claim 12 wherein the level of said evaporation-suppressing agents is about 5% by weight or less based on the total weight of the aqueous polymer composition.

16. A composition of claim 12 wherein the level of said evaporation-suppressing agents is about 1% by weight or less based on the total weight of the aqueous polymer composition.

17. A composition of claim 12 wherein the aqueous polymer product is selected from the group consisting of acrylic, styrene acrylic, styrene butadiene, and vinyl acetate polymeric latexes.

18. A composition of claim 12 wherein the evaporation-suppressing agents are selected from the group consisting of $CH_3(CH_2)_{15}OH$, $CH_3(CH_2)_{17}OH$, $CH_3(CH_2)_{19}OH$, $CH_3(CH_2)_{21}OH$, $CH_3(CH_2)_{17}(OCH_2CH_2)_2OH$, $CH_3(CH_2)_{17}OCH_2CH(OH)CH_2OH$, $CH_3(CH_2)_{21}OCH_2CH_2OH$, $CH_3(CH_2)_{21}OCH_2CH_2CH_2OH$ and $CH_3(CH_2)_{21}OCH_2CH(OH)CH_2OH$.

* * * * *